(12) United States Patent
Scott et al.

(10) Patent No.: US 12,172,131 B2
(45) Date of Patent: Dec. 24, 2024

(54) DEVICE SUITABLE FOR VACUUM ASSISTED FILTRATION

(71) Applicant: EMD Millipore Corporation, Burlington, MA (US)

(72) Inventors: Christopher A. Scott, Westford, MA (US); Kurt Greenizen, Atkinson, NH (US); Paul Sydlowski, Danvers, MA (US)

(73) Assignee: EMD Millipore Corporation, Burlington, MA (US)

( * ) Notice: Subject to any disclaimer, the term of this patent is extended or adjusted under 35 U.S.C. 154(b) by 0 days.

(21) Appl. No.: 18/437,727

(22) Filed: Feb. 9, 2024

(65) Prior Publication Data

US 2024/0226811 A1    Jul. 11, 2024

Related U.S. Application Data

(63) Continuation of application No. 16/328,502, filed as application No. PCT/US2017/055219 on Oct. 5, 2017, now Pat. No. 11,925,904.

(60) Provisional application No. 62/409,030, filed on Oct. 17, 2016.

(51) Int. Cl.
   *B01D 63/08* (2006.01)
   *B01D 61/18* (2006.01)
   *B01D 61/20* (2006.01)

(52) U.S. Cl.
   CPC .......... *B01D 63/087* (2013.01); *B01D 61/18* (2013.01); *B01D 61/20* (2013.01); *B01D 2201/204* (2013.01)

(58) Field of Classification Search
   CPC ................ B01D 29/05; B01D 29/085; B01D 2201/204; B01D 61/18; B01D 61/20; B01D 63/087; B01D 36/001; B01D 63/081; B01D 29/58; B01D 2311/14; B01D 2313/44; B01D 29/01; B01D 35/301; B01D 61/08; B01D 61/145; B01D 61/147; B01D 61/22; B01D 61/32; B01D 63/08; B01D 69/10;
   (Continued)

(56) References Cited

U.S. PATENT DOCUMENTS

| | | | |
|---|---|---|---|
| 3,295,686 A | 1/1967 | Krueger | |
| 4,487,606 A | 12/1984 | Leviton et al. | |
| 4,683,058 A | 7/1987 | Lyman et al. | |

(Continued)

FOREIGN PATENT DOCUMENTS

| | | |
|---|---|---|
| CN | 101044387 A | 9/2007 |
| CN | 101082023 A | 12/2007 |

(Continued)

OTHER PUBLICATIONS

U.S. Appl. No. 16/328,502, filed Feb. 26, 2019, Allowed.

(Continued)

*Primary Examiner* — Pranav N Patel
(74) *Attorney, Agent, or Firm* — EMD Millipore Corporation

(57) ABSTRACT

A funnel-less filtration device that attaches directly to a storage container such as a cell culture media bottle. The device includes a filter collar containing one or more membranes, an inlet with a coupling device for attaching the filter device to a supply of liquid to be filtered, an outlet at a lower portion of the collar, a vacuum port in the collar below the membrane(s) and a filtered vent in the collar above the membrane(s).

5 Claims, 8 Drawing Sheets

(58) Field of Classification Search
CPC ........... B01L 2300/0681; B01L 3/5635; B01L 2400/049

See application file for complete search history.

(56) References Cited

U.S. PATENT DOCUMENTS

| | | |
|---|---|---|
| 5,141,639 A | 8/1992 | Kraus et al. |
| 5,601,711 A | 2/1997 | Sklar et al. |
| 5,603,900 A | 2/1997 | Clark et al. |
| 5,792,425 A | 8/1998 | Clark et al. |
| 5,873,967 A | 2/1999 | Clark et al. |
| 7,335,337 B1 | 2/2008 | Smith |
| 7,806,274 B2 | 10/2010 | Scott et al. |
| 2002/0096468 A1 | 7/2002 | Zuk |
| 2003/0039589 A1 | 2/2003 | Smith |
| 2003/0236481 A1 | 12/2003 | Burbank |
| 2004/0188344 A1 | 9/2004 | Scott et al. |
| 2008/0092435 A1 | 4/2008 | Bzdek et al. |
| 2008/0197067 A1 | 8/2008 | Ross et al. |
| 2008/0290040 A1 | 11/2008 | Kane et al. |
| 2015/0108058 A1 | 4/2015 | Clark et al. |
| 2021/0299614 A1 | 9/2021 | Scott et al. |

FOREIGN PATENT DOCUMENTS

| | | |
|---|---|---|
| CN | 101236203 A | 8/2008 |
| CN | 101629140 A | 1/2010 |
| CN | 102179177 A | 9/2011 |
| CN | 104925334 A | 9/2015 |
| CN | 105473854 A | 4/2016 |
| CN | 105771659 A | 7/2016 |
| EP | 0339769 A1 | 11/1989 |
| EP | 0378353 B1 | 10/1997 |
| EP | 0535212 B1 | 10/1997 |
| EP | 1953552 A1 | 8/2008 |
| ES | 2211122 T3 | 7/2004 |
| ES | 2230312 T3 | 5/2005 |
| JP | H06-41634 Y2 | 11/1994 |
| JP | 34-66878 B2 | 11/2003 |
| JP | 39-15126 B2 | 5/2007 |
| JP | 2010-537797 A | 12/2010 |
| JP | 2010-540239 A | 12/2010 |
| WO | 2018/075250 A1 | 4/2018 |

OTHER PUBLICATIONS

Advisory Action received for U.S. Appl. No. 16/328,502, mailing date on May 27, 2022, 3 Pages.

Final Office Action Received for U.S. Appl. No. 16/328,502, mailing date Mar. 11, 2022, 6 Pages.

Final Office Action Received for U.S. Appl. No. 16/328,502, mailing date on May 3, 2023, 12 Pages.

Non Final Office Action Received for U.S. Appl. No. 16/328,502, mailing date Jul. 21, 2022, 9 Pages.

Notice of Allowance received for U.S. Appl. No. 16/328,502, mailing date Nov. 17, 2023, 8 Pages.

Communication pursuant to Article 94(3) EPC received for European Patent Application No. 17794126.7 mailing date Aug. 2, 2022, 5 Pages.

Office Action received for Japanese Patent Application No. 2019-520370, mailing date Sep. 13, 2022, 19 Pages (9 Pages of English Translation & 10 Pages of Official Copy).

International Search Report and Written Opinion received for PCT Application No. PCT/US2017/055219, mailing date Dec. 18, 2017, Dec. 18, 2017, 10 pages.

International Preliminary Report on Patentability received for PCT Application No. PCT/US2017/055219 mailing date May 2, 2019, 9 Pages.

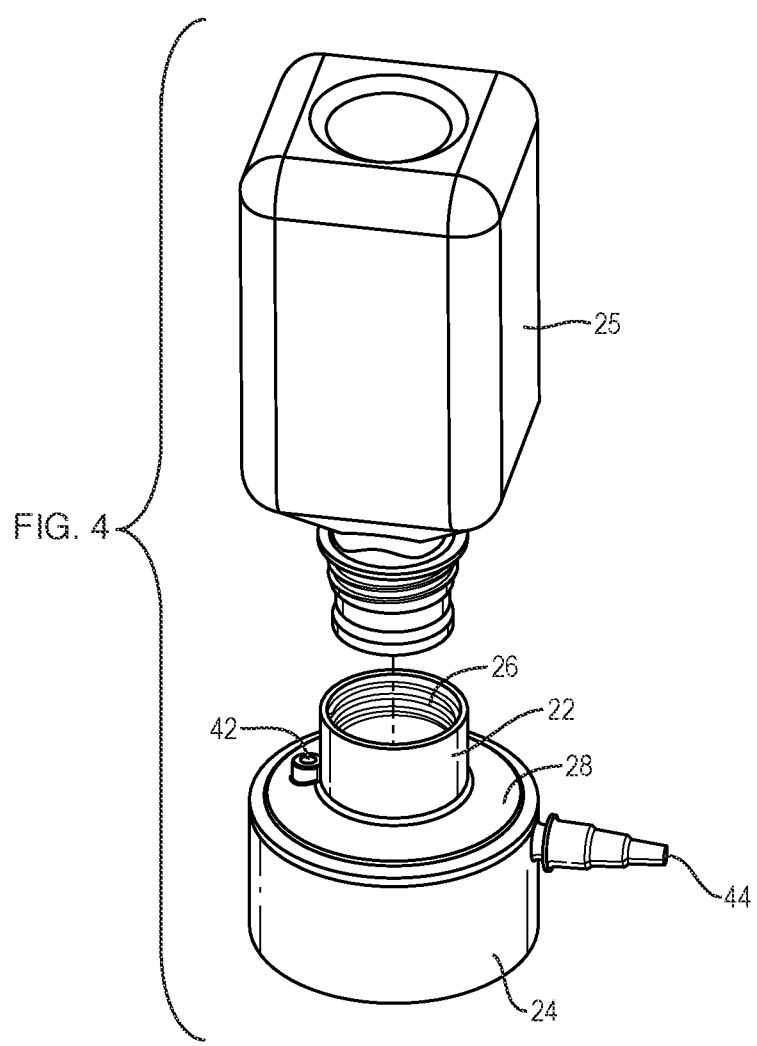

DEVICE SUITABLE FOR VACUUM ASSISTED FILTRATION

CROSS-REFERENCE TO RELATED APPLICATIONS

The present application is a continuation of U.S. patent application Ser. No. 16/328,502, filed Feb. 26, 2019, which is a U.S. National Stage Application of PCT International Application No. PCT/US2017/055219, filed Oct. 5, 2017, which claims the benefit of priority of U.S. Provisional Patent Application No. 62/409,030, filed Oct. 17, 2016, each of which is incorporated by reference herein in their entirety.

The embodiments disclosed herein generally relate to vacuum filter devices and particularly to such devices for filtering liquids from one container through a membrane and depositing the filtrate directly into another container.

BACKGROUND

Numerous laboratory devices have been developed to carry out filtration, in order to concentrate, separate and/or purify laboratory samples. Researchers routinely need to concentrate their sample prior to other investigative research. Devices for filtering biological solutions generally involve three primary components, i.e. a membrane filter interposed between two vessels, a feed funnel located upstream of the membrane for holding the sample solution to be filtered and a filtrate container located downstream of the membrane filter for collecting the filtered sample solution. Typically a vacuum is drawn downstream of the membrane to increase the rate of filtration by creating a pressure differential across the filter.

Several device designs have been made for filtering a feed liquid into a filtrate container. These are typically used to clarify and sterilize biological solutions, such as fetal calf serum, tissue culture media and the like as well as non-sterile applications such as clarification of HPLC buffers and purification of other aqueous based buffers and solutions.

FIG. 1 shows a typical design of these conventional devices. The user transfers the feed liquid from a storage vessel to the upper funnel 12 of the device 10. The funnel 12 is generally open topped and can be closed by a removable lid 11. A filter collar 15 is sealed or otherwise permanently attached to the open bottom 14 of the funnel 12. The lower portion of the filter collar 15 is attached to a collection reservoir or container 13. Typically this done by a threaded connection extending from the outlet of the filter collar 15 on its bottom surface (not shown) to a threaded inlet (not shown) formed in or on the collection reservoir or container 13 or by simply arranging the outlet of the filter collar 15 over the inlet or open top of the collection reservoir or container 13. One such device is known as the STERICUP® system commercially available from EMD Millipore Corporation, Billerica Massachusetts.

Vacuum filtration systems such as these are ideally suited for sterile filtration of cell culture media, buffers and reagents. This device can handle a maximum unfiltered volume of 0.15 to 2 liters based on the size of the feeding funnel. Large volumes can be processed continuously, as determined by the volume of the feed and filtrate storage vessels.

The devices supplied today are in a completed form including a funnel and lid attached to a filtration collar, with an attached reservoir below. The assembly comes bagged with packaged bottle caps, and are sterilized such as by gamma sterilization making it single use and disposable as well as reducing the risk of contamination.

Nonetheless, vacuum filter devices of the type described suffer from a number of drawbacks which make them inconvenient for laboratory use. First, these devices require the liquid sample be transferred from its normal laboratory container to an open funnel which can lead to spills, sample contacting more surfaces which can introduce loses to the surface by non-specific binding or addition of unwanted species from improperly cleaned or handled labware. Additionally, to limit issues of sterility, the transfer often occurs in a laminar flow hood which has limited height and space for such work, making the transfer difficult and often messy. There are also ergonomic concerns especially for those having to multiple samples at one time and for those that filter larger volumes of 1 lite or more. Aside from the inconvenience to the user in handling the fluid to be filtered, there is an enhanced risk of compromising the sterility of the particular biological solution due to the open nature of this device. Moreover, the large size of these filter assemblies results in their taking up limited laboratory storage space and increase the shipping space and cost due to their large size/volume occupied by the assembled funnel/collar/reservoir. In addition, since the containers utilized in the filtration process are disposable and intended for one-time use, a significant amount of solid waste is generated by these filter assemblies and the associated pre- and post-filtration containers. In particular, as the membrane is not recyclable and the collar containing the membrane and funnel are rigidly and permanently attached to each other the whole top portion cannot be recycled.

What is needed is a device for vacuum filtration, especially in laboratory settings, that has ease of use, a more ergonomic operation, reduced storage and shipping requirements and minimal disposable hardware as well as avoiding spillage of the biological solution. In certain other applications, preserving the sterility of the solution being filtered is also important.

SUMMARY OF THE INVENTION

The problems of the prior art have been overcome by the embodiments disclosed herein, which provide a device particularly useful for large volume filtration of sample, although the applications are not limited to filtration. In certain embodiments, the device provides rapid high-quality separations or purifications of samples in a convenient and reliable manner.

The present invention is a funnel-less filtration device that attaches directly to a storage container such as a cell culture media bottle.

In certain embodiments, the device includes a filter collar containing one or more membranes, an inlet with a coupling device for attaching the filter device to a supply of liquid to be filtered, preferably the coupling device is a threaded at a top portion of the collar, an outlet at a lower portion of the collar, a vacuum port in the collar below the membrane(s) and a filtered vent in the collar above the membrane(s).

Optionally, the device may include a filtrate reservoir attached to the outlet, preferably by a threaded connection.

Optionally, the upper opening to the filter collar is selectively and removably sealed with a lid until used. The lid is then removed and a storage container such as cell culture media bottle is attached to the upper opening of the filter collar.

Upon subjecting the sample in the bottle to a driving force such as vacuum, the sample flows through the filtration element, and into a filtrate reservoir below the outlet of the filter collar.

BRIEF DESCRIPTION OF THE DRAWINGS

FIG. 4 perspective view of a device of FIGS. 2 and 3.

DETAILED DESCRIPTION

Figure 1:
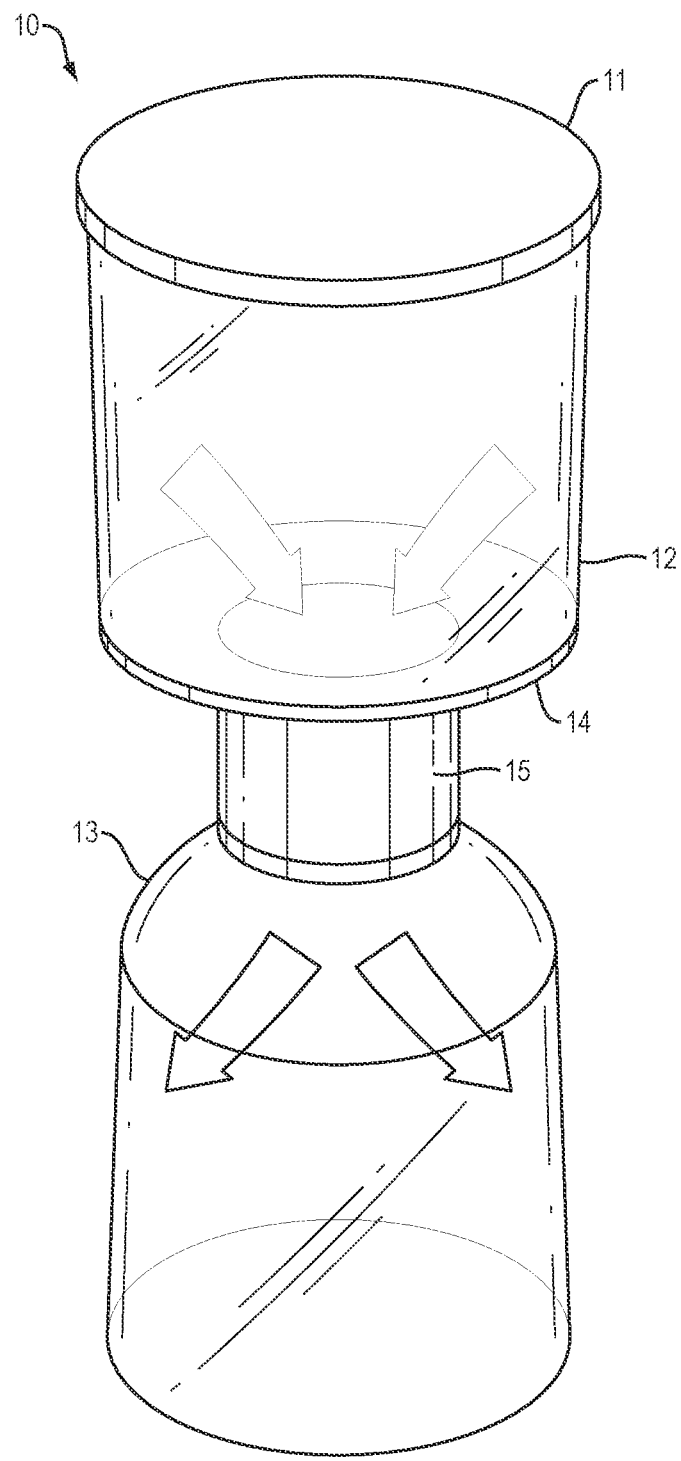
FIG. 1 is a perspective view of a device according to the prior art.
Figure 2:
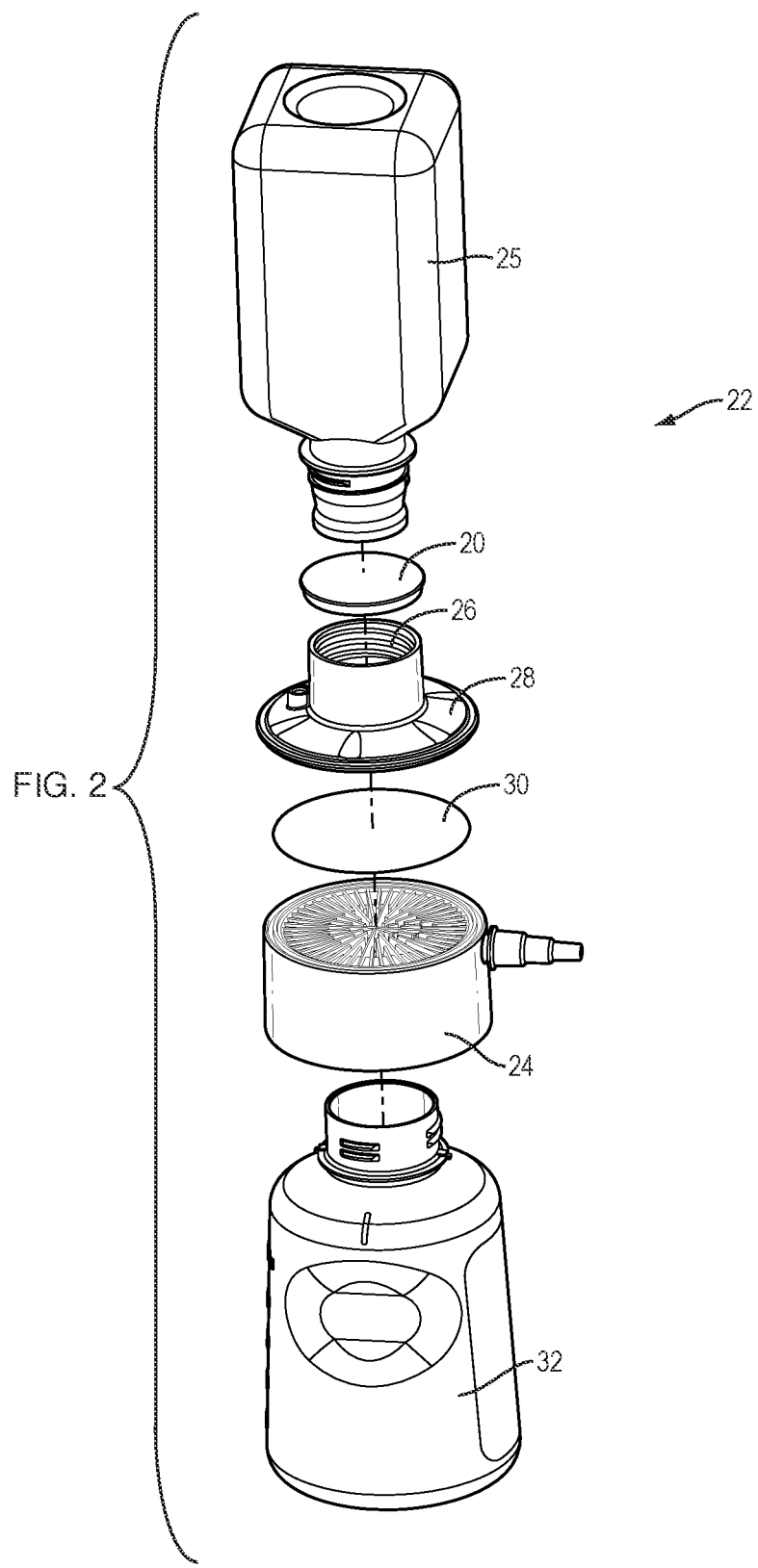
FIG. 2 is an exploded perspective view of a device of the present invention in accordance with certain embodiments.
Figure 3:
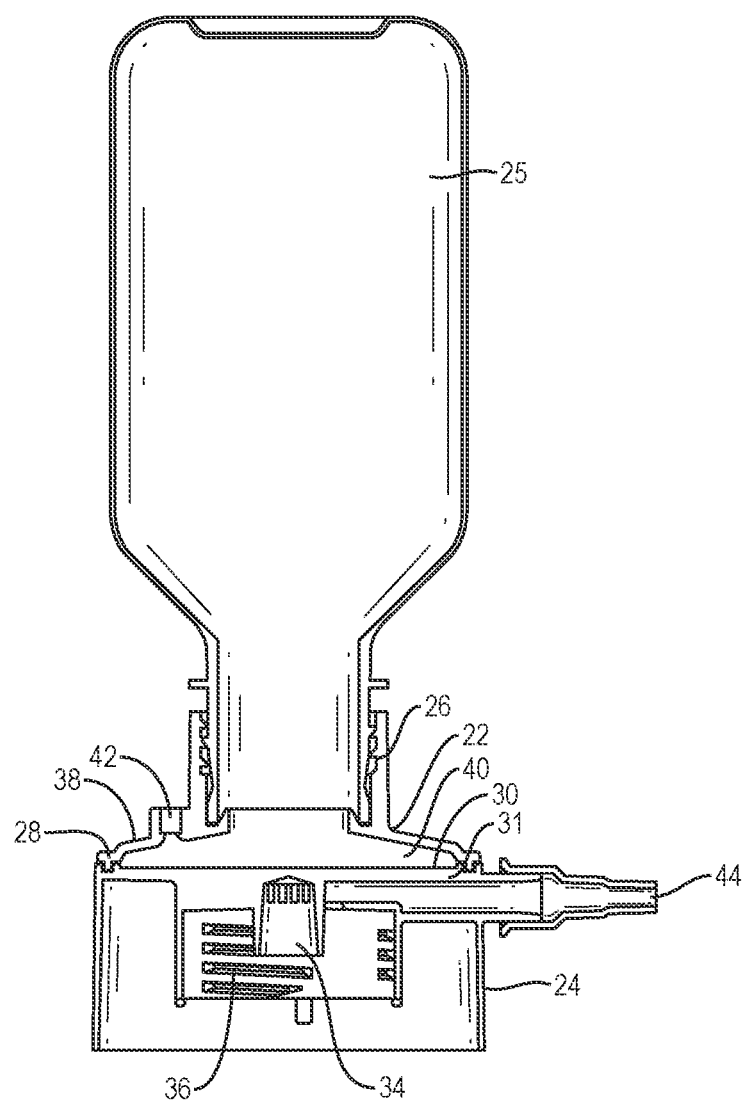
FIG. 3 is a cross section view of the collar of FIG. 2.

Turning first to FIGS. 2-4, there is shown one embodiment of the present invention. As shown, the filter device 18 has an optionally removable protective cap or lid 20 is placed over and removably sealed to an inlet 22 of a filter collar 24. The inlet 22 has a coupling device 26 at an uppermost portion, such as a female threaded portion, and a sealing rim 28 below the coupling device 26 for sealing the inlet 22 by the sealing rim 28 to the upper portion of the rest of the filter collar 24. This may be done by heat sealing or ultrasonically welding the components 28 and 24 together. The coupling device 26 can be selectively secured to a supply container 25 for filtration of the liquid within the container 25 during use of the device.

The collar 24 has one or more membranes 30 which are sealed between upper surface of the collar 24 and the sealing rim 28 of the inlet 22. The membrane(s) are typically supported on a porous plate 31. The membrane(s) may be glued, welded or heat bonded to the plate 31 or other inner surface of the collar 24 or the membrane(s) may be compression sealed by one or gaskets or o-rings arranged between the plate 31 and the sealing rim 28 so that any liquid entering the inlet 22 must pass through the membrane(s) before exiting the outlet 34.

Figure 7:
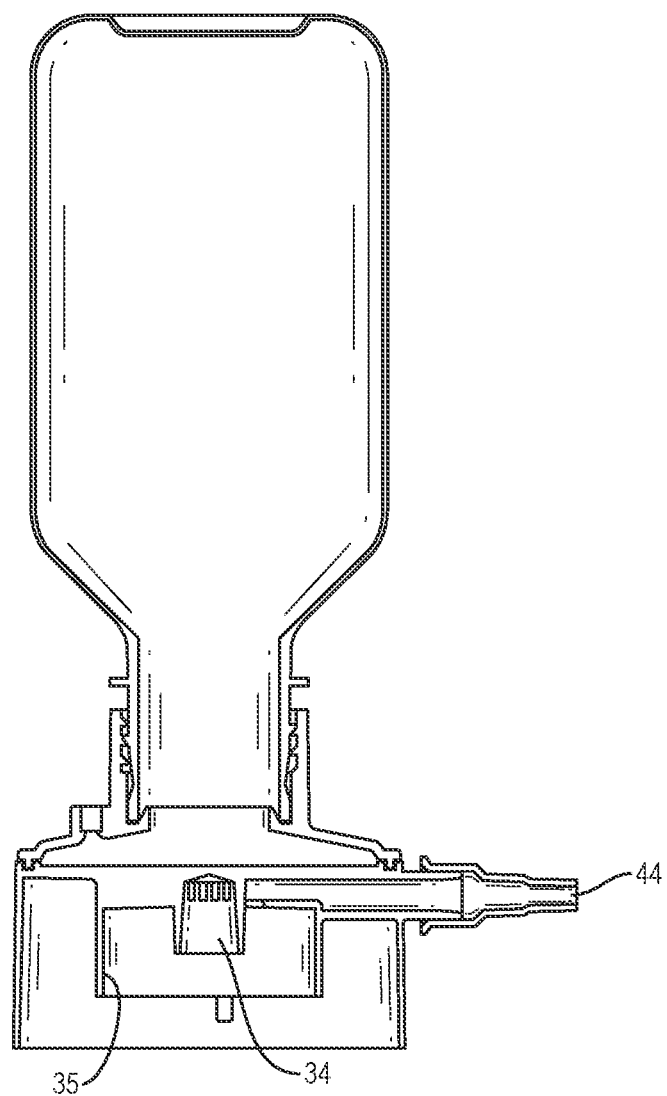
FIG. 7 shows an alternative embodiment of FIG. 3 in cross sectional view.

A filtrate reservoir 32 is located below the outlet 34 of the collar 24. In the embodiment shown in FIG. 3, the reservoir 32 (not shown) can be attached to the outlet 34 by a series of interacting screw threads 36. Alternatively, the outlet 34 can be unthreaded 35 and can simply be placed over the inlet of a bottle or other container that will act as the reservoir 32 (not shown) as shown in FIG. 7.

The sealing rim 28 of the inlet 22 has a domed portion 38 so as to provide for a space or gap 40 between the inlet 22 and the membrane(s) 30 as shown in FIG. 3. A vent 42 is located in the gap and provides a passageway for the entrance of air into the gap 40 from the exterior of the device. The vent 42 has a filter such as a hydrophobic porous frit or a hydrophobic membrane (not shown) that filters the air entering the device so as to reduce any risk of outside contamination by dust, or bacteria. The vent 42 allows air to enter the gap 40, flow through the inlet 22 and into media bottle 25 to replace the liquid that is filtered during use.

The collar 24 has a line 44 for the source of driving pressure for the system such as a vacuum. This line has a bore that extends from a position below and outside of the outlet 34 to an exterior of the collar as shown in FIG. 3. A tube (not shown) can be attached to the end of the line on the exterior of the collar 24 to allow for the passage of the driving force to work in the device and create a flow of filtration through it.

The reservoir 32, if used, is a generally cylindrical one-piece container that can hold relatively large volumes of sample, such as about 500 or 1000 milliliters, although the volume capacity is not particularly limited. Typically the reservoir 32 has a threaded opening which selectively mates with the threaded outlet of the collar 24. In certain embodiments, it is advantageous to have a cap (not shown) for the reservoir 32. Users often store media in the reservoir 32 for weeks at a time, and access the reservoir 32 regularly to feed cells with filtered media or to use other liquids such as reagents in a series of experiments. Such caps are often provided with the prior devices and are well known to one of ordinary skill in the art.

In certain embodiments, the reservoir 32 is made of a plastic such as polystyrene, polycarbonate, a member of the PET family (e.g., PETG, PETE), and a polyolefin, particularly polypropylene, but may also be made from any other suitable material not deleterious to the operation (keeping in mind cost and vacuum strength). In some cases glass reservoirs can be used for the storage of filtrate for HPLC and other applications.

The membrane(s) 30 may be of any variety commonly used in filtering biological specimens including but not limited to microporous membranes, ultrafiltration membranes, nanofiltration membranes, or reverse osmosis membranes. Preferably microporous membranes, ultrafiltration membranes or nanofiltration membranes are used. Even more preferably, microporous membranes are used.

Representative suitable microporous membranes include cellulose, regenerated cellulose composites, nitrocellulose, cellulose acetate, polysulphones including polyethersulphone and polyarylsulphones, polyvinylidene fluoride, polyolefins such as ultrahigh molecular weight polyethylene, low density polyethylene and polypropylene, nylon and other polyamides, PTFE, thermoplastic fluorinated polymers such as poly (TFE-co-PFAVE), polycarbonates or particle filled membranes such as EMPORE® membranes available from 3M of Minneapolis, Minnesota. Such membranes are well known in the art and are commercially available from a variety of sources including EMD Millipore Corporation of Billerica, Massachusetts. If desired these membranes may have been treated to render them hydrophilic. Such techniques are well known and include but are not limited to grafting, crosslinking or simply polymerizing hydrophilic materials or coatings to the surfaces of the membranes.

Representative ultrafiltration or nanofiltration membranes include polysulphones, including polyethersulphone and polyarylsulphones, polyvinylidene fluoride, and cellulose. These membranes typically include a support layer that is generally formed of a highly porous structure. Typical materials for these support layers include various non-woven materials such as spun bounded polyethylene or polypropylene, or glass or microporous materials formed of the same or different polymer as the membrane itself. Such membranes are well known in the art, and are commercially available from a variety of sources such as EMD Millipore Corporation of Billerica, Massachusetts.

The use of inorganic materials such as glass fibers or mats, ceramic filters and the like is also possible as well as membrane structures that are not microporous (e.g. depth filters), non-woven filters, etc. In some applications, a combination of membranes may provide improved performance. For example, for particularly dirty samples, a depth filter which functions as a prefilter matrix in combination with a microporous membrane below it can be used. In embodiments used to recover nucleic acids such as DNA and RNA, glass fibers or mats may be used alone or in combination with one or more prefilter layers above it and/or one or more microporous layers below it.

Suitable polymers which can be used to form the collar and inlet include but are not limited to polycarbonates, polyesters, nylons, PTFE resins and other fluoropolymers, acrylic and methacrylic resins and copolymers, polysulphones, polyethersulphones, polyarylsulphones, polystyrenes, polyvinyl chlorides, chlorinated polyvinyl chlorides, ABS and its alloys and blends, polyolefins, preferably polyethylenes such as linear low density polyethylene, low density polyethylene, high density polyethylene, and ultra-high molecular weight polyethylene and copolymers thereof, polypropylene and copolymers thereof and metallocene generated polyolefins.

Preferred polymers are polyolefins, in particular polyethylenes, polypropylene and their copolymers, polystyrenes, acrylic and polycarbonates.

The vent filter is generally either a membrane such as the microporous ones described above or preferably a hydrophobic porous frit such as Filtrona R #212831 and Porex #6950 frits. Any membrane or frit chosen should be selected to match the air flow with the desired liquid flow. Typically these devices have a flow rate of about 500 millilters/minute.

The lid 20 of the filter device 18 can be a plastic or metal foil which has been heat sealed or adhered across the top of the inlet 22. Alternatively, it may be a threaded plug made of plastic, metal or rubber with threads the same as those contained in the inlet 22 so as to selectively seal off the inlet 22 during shipping or storage.

Most supply containers are bottles having an outside surface of the container opening containing threads. Typically they come in either GL38 or GL45 standard bottle thread formats and the threads of the inlet 22 are designed to be one of those diameters with matching thread configurations so that the threads of the supply container 25 match and mate with those of the inlet 22. Other sizes can be used and the device can be made to match them.

Figure 6:
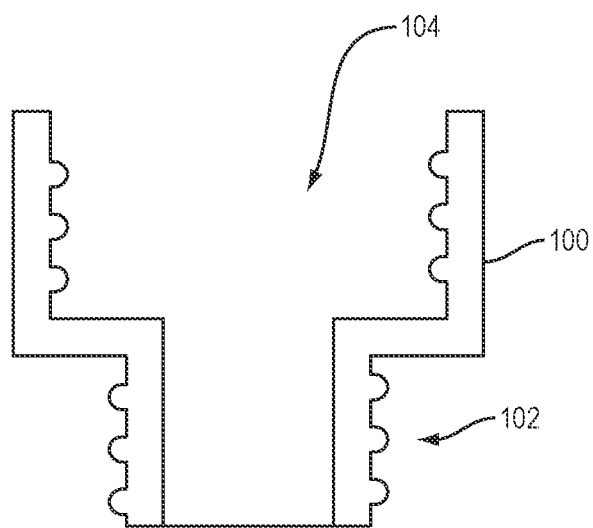
FIG. 6 shows in cross sectional view an adaptor for supply containers of different sizes or thread configurations than the inlet of the filter device of the present invention.

Alternatively, as shown in FIG. 6, one can supply an adaptor 100 which has a male end 102 that mates with the threads of the inlet 22 and a female end 104 with a diameter and thread configuration that mates with the desired supply container 25.

Figure 5C:
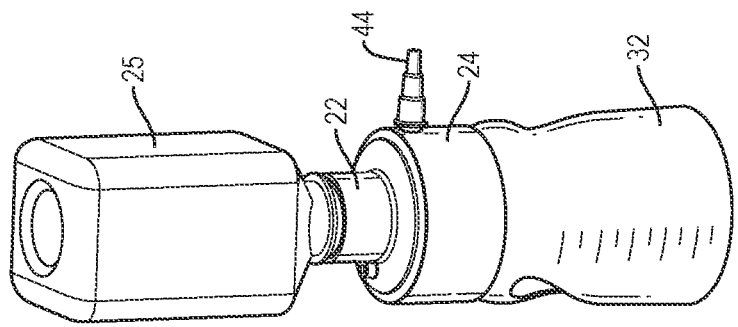
FIGS. 5A-C show a perspective view of the arrangement of the device and liquid supply during use.
Figure 5B:
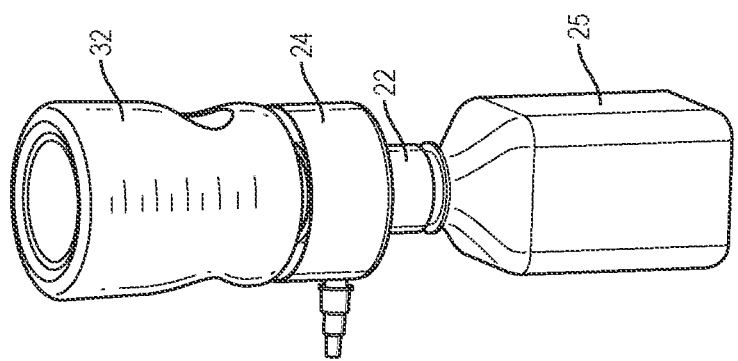
Figure 5A:
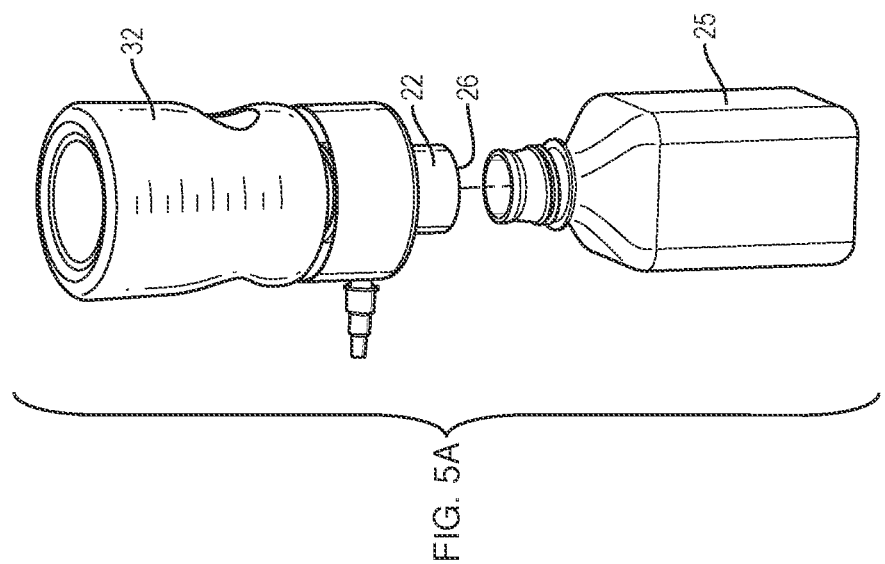

FIGS. 5A-C show the device in its different positions during use.

In operation, a sample solution to be filtered is contained in a supply container such as a media bottle 25 which can be purchased from a supplier such as Sigma-Aldrich Co LLC or EMD Millipore Corporation. The cap (not shown) of the container 25 has been removed as shown in FIGS. 5A-C. Likewise, if used, the lid 20 (not shown) of the filter device 18 has also been removed.

As shown in FIG. 5A, the container 25 and the device 18 are side by side each other. The filter device 18 is then raised above and inverted over the container 25 as shown in FIG. 5B. The filter device 18 is threaded or otherwise liquid tightly attached to the mouth of the container 25 by the inlet 22. The assembled container 25 and filter device 18 are then flipped such that the container 25 is now inverted and supported on the filter device 18 which is now standing vertically erect (FIG. 5C).

A length of tubing (not shown) is connected to a vacuum pump (not shown) and a vacuum is applied to port 44 and the reservoir 32 is evacuated of air and the pressure therein correspondingly reduced. The unprocessed sample solution is then passed from the higher pressure container 25 through the inlet 22 into the collar 24 and through the membrane(s) 30. The filtered solution flows through the outlet 34 and collects as filtrate in the reservoir 32. To maintain the pressure differential, which serves as a driving force, air at atmospheric pressure enters through the vent 42 and replaces the volume of sample solution that passes through the membrane(s) 30.

When the filtration is completed, the empty container 25 can be removed from the filter device 18 and recycled. The collar 24 may stay on the reservoir 32 or it may be replaced with a cap (not shown).

The present device provides a filtration device that is easier to use and provides for greater recycling of the components than before.

The device uses about 40% less plastic than the previous designs.

Likewise it provides a less messy approach to filtration as the unfiltered liquid does not need to be poured into a funnel from a container. Additionally, it is ergonomically an improvement as one doesn't have to lift and hold a 1 liter bottle of liquid under a hood while poring and filtering the liquid. Moreover, because it is a closed system there is no chance to spill liquid or tip the device or to cause contamination as can occur with the current devices. Rather it is directly supplied from the container to the filter device in neat and clean liquid tight manner.

Figure 8B:
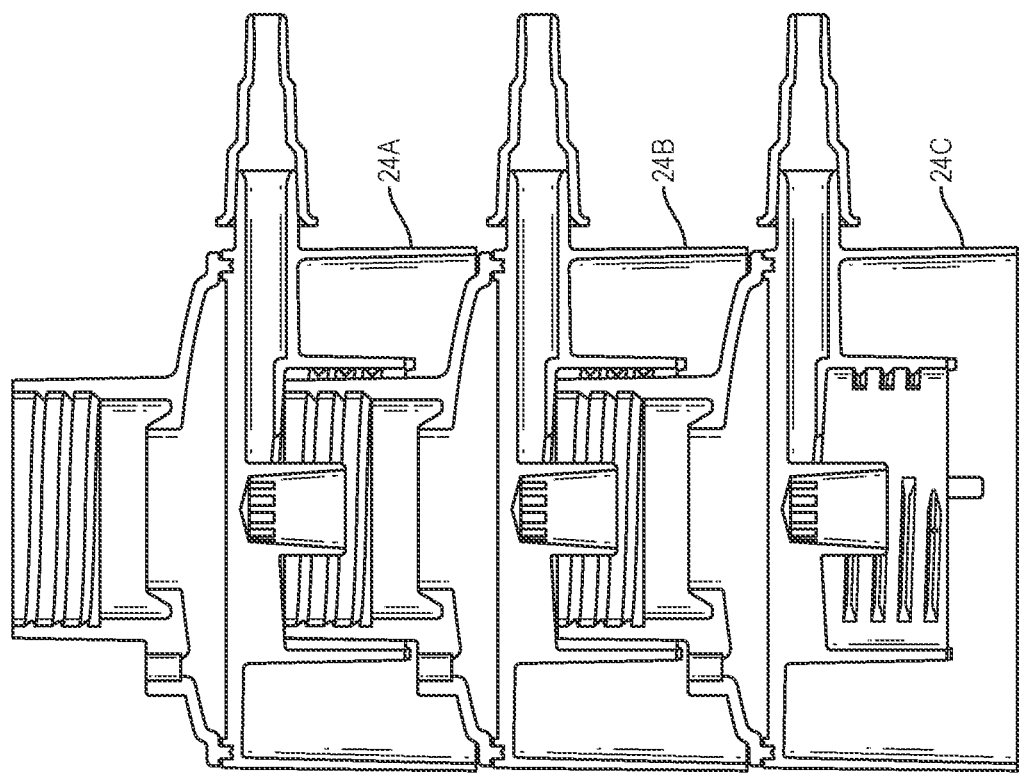
FIGS. 8A and 8B show the collar of the present invention in a stacked configuration, both in perspective (8A) and cross sectional (8B) views.
Figure 8A:
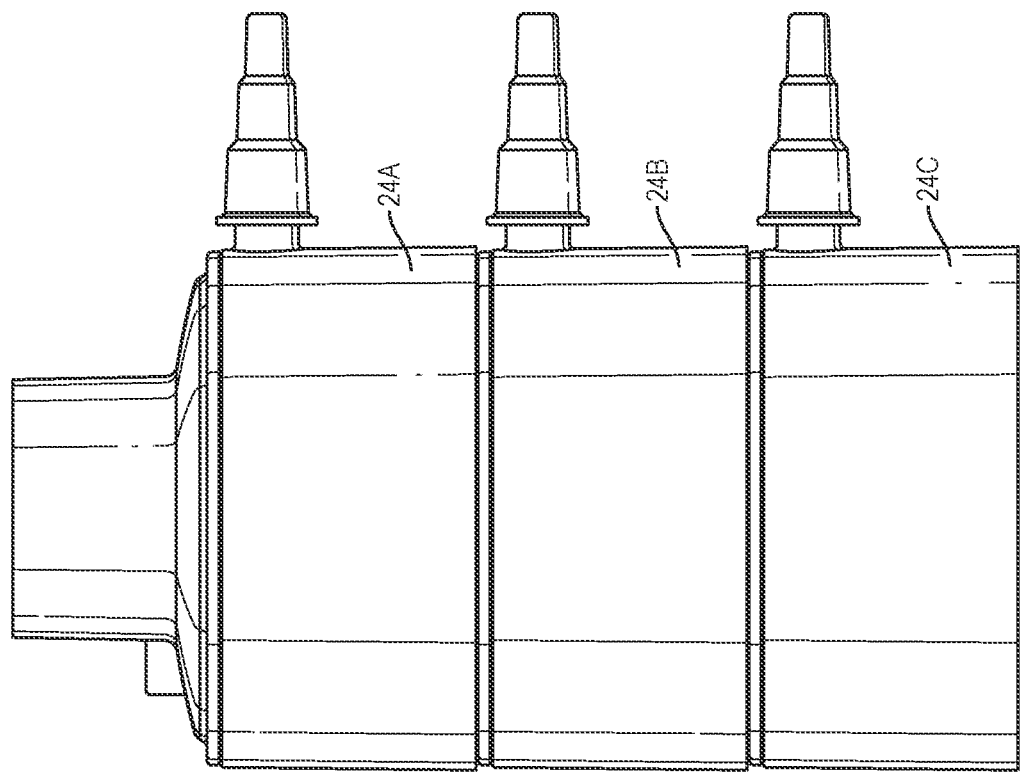

Additionally, by being funnel-less it has a smaller profile making it easier for use in laminar flow hoods and for storage and shipping. In one embodiment shown in FIGS. 8A and B, the collars alone (24A-C) are stored in a stacked configuration for shipping and storage.

Moreover it uses about 50% less space during shipping and storage when provided with the reservoir 32 attached and up to 70% less space when only the collar 24 is provided and stacked up each other.

Lastly as only the collar cannot be recycled it dramatically reduces the amount of material that cannot be recycled.

What is claimed is:

1. A method of using a vacuum filter device comprising;
   a. providing a vacuum filter device having a filter collar having a lower and a top portion disposed from one another, the top portion having an inlet with a coupling device; one or more membranes tightly sealed within the collar, wherein the inlet comprises a domed portion forming a gap between the inlet and the one or more membranes, and a coupling device at a substantially center portion of the inlet; a vent comprising a filter and containing a passageway in the domed portion of the filter collar, wherein the passageway is substantially perpendicular to the one or more membranes and the vent is off-center on the domed portion; a reservoir adjacent to an outlet for receiving filtrate that has passed through the one or more membranes and outlet, a line having a bore throughout from an interior of the collar adjacent the outlet to an exterior of the collar, the line being adapted to be connected to a source for drawing a liquid through the one or more membranes and into the reservoir;

b. connecting a supply container directly to the top portion through the coupling device, wherein the supply container is above the top portion when the vacuum filter device is in use;

c. placing the supply container vertically upright above the top portion and inverting the filter device over the opening of the container;

d. connecting the opening of the container to the inlet of the filter device in a liquid tight manner to form an assembly;

e. inverting the assembly such that the supply container is now inverted above the filter device, the vent is lower than the upper opening, the coupling device is above the one or more membranes tightly sealed within the collar and at the uppermost portion of the inlet, and the outlet is located beneath the one or more membranes;

f. attaching a tubing connected to a driving source to the line of the collar and applying the driving source to result in the liquid of the supply container going through the one or more membranes and into the reservoir for collection and further use and gas in the atmosphere surrounding the vacuum filter device being pulled through the vent and into the gap and inlet on an upstream side of the one or more membranes as the liquid passes through the membrane.

2. The method of claim 1, wherein the driving source is a vacuum.

3. The method of claim 1, wherein air is pulled through the vent by the driving source and supplied to the container to replace the liquid that has been filtered.

4. The method of claim 1, wherein the one or more membranes is selected from the group of types consisting of: microporous membranes, ultrafiltration membranes, nanofiltration membranes, and reverse osmosis membranes.

5. The method of claim 4, wherein the one or more membranes is a microporous membrane selected from the group consisting of cellulose, regenerated cellulose composites, nitrocellulose, cellulose acetate, polysulphones, polyvinylidene fluoride, polyolefins, nylon, polytetrafluoroethylene (PTFE), thermoplastic fluorinated polymers, polycarbonates, and particle filled membranes.

* * * * *